UNITED STATES PATENT OFFICE.

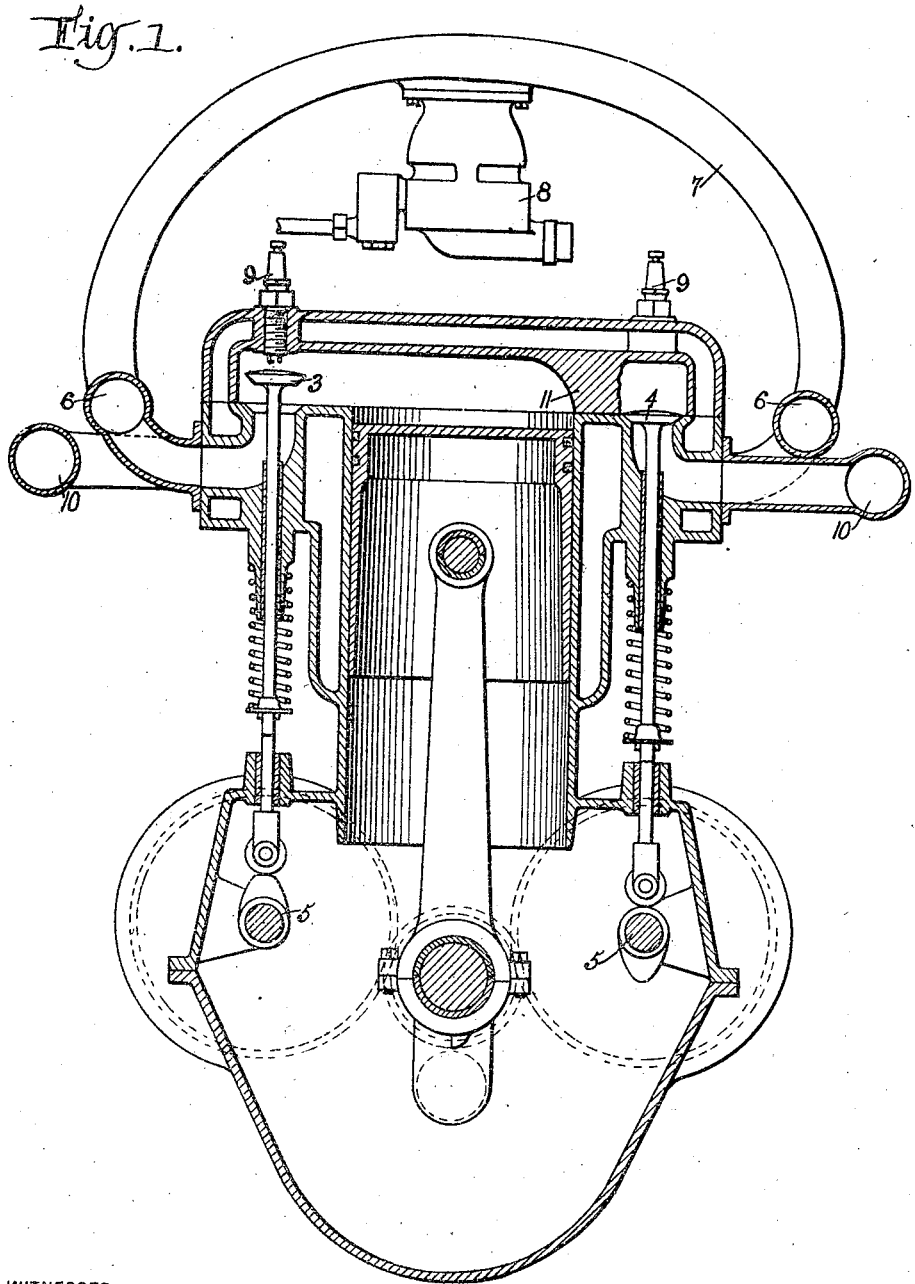

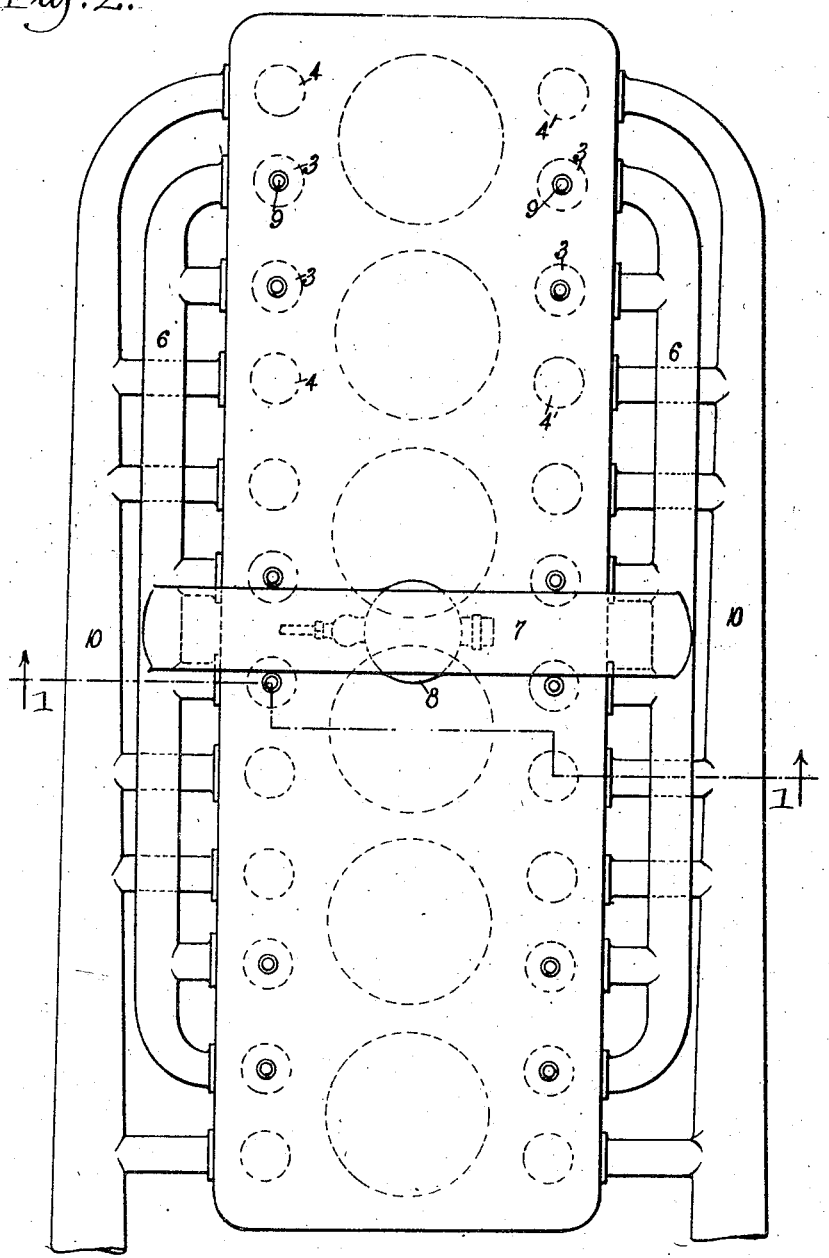

SAMUEL LAWRENCE WALDEN, OF ATLANTIC CITY, NEW JERSEY.

INTERNAL-COMBUSTION ENGINE.

1,359,939.     Specification of Letters Patent.     Patented Nov. 23, 1920.

Application filed August 21, 1917. Serial No. 187,328.

*To all whom it may concern:*

Be it known that I, SAMUEL L. WALDEN, a citizen of the United States, and a resident of Atlantic City, in the county of Atlantic and State of New Jersey, have invented a new and Improved Internal-Combustion Engine, of which the following is a full, clear, and exact description.

My invention relates to improvements in internal combustion engines. The object is to provide improved means for the efficient and even distribution of the charge to the cylinders, means for increasing the efficiency of ignition, and means for increasing the efficiency of the exhaust, whereby more thorough scavenging is effected and back pressure is reduced to a minimum.

The invention also comprises a simplicity of construction whereby the assembling, disassembling and interchanging of parts are greatly facilitated.

Referring to the drawings, which illustrate merely by way of example a suitable embodiment of my invention—

Figure 1 is a vertical section of an engine embodying my invention, taken on line 1, 1 of Fig. 2, on a slightly enlarged scale.

Fig. 2 is a top plan view.

Similar numerals refer to similar parts throughout the several views.

As will be noted, my invention is shown as applied to engine cylinders having shoulders or offset spaces on each side of each cylinder. In each of these offset spaces are provided and arranged, side by side, an admission valve 3 and an exhaust valve 4. The valves 3 control the ports communicating with the detachable gas supply manifolds 6. Each of the manifolds 6 may be provided with an independent carbureter if so desired, or united together as shown. The exhaust valves 4 control ports communicating with the exhaust manifolds 10. Over each admission valve 3 is provided the spark plug 9.

In the present example the two manifolds 6 are shown connected with the carbureter 8 by the downwardly extending tube 7. The carbureter 8 is positioned above the cylinders and midway or equi-distant between the two manifolds 6. The tube 7 is located midway the two ends of the series of cylinders, so that the carbureter is positioned centrally with respect to the several inlet ports and at an elevation above the same. This arrangement facilitates the flow of gas, and secures an even and balanced distribution to both sides of each cylinder.

The arrangement whereby the flanking manifolds are disengageably connected on each side of the cylinders with the connecting tube 7 over the middle part of the block of cylinders, and with the carbureter 8 connected to the middle part of said tube and above the cylinder block, presents an extremely simple and efficient arrangement, said parts being readily removable.

The central location of the carbureter with a short downwardly extending conductor, equi-distant to each manifold 6, secures an extremely efficient and balanced delivery of gas to both sides of each cylinder. The location of a spark plug over each intake valve on each side of each cylinder, secures the maximum efficiency of ignition.

The arrangement of the exhaust ports on each side of each cylinder and adjacent the gas intake ports, with ample exhaust manifolds therefor flanking the cylinders, contributes in securing an ample scavenging of the cylinder and reduces to a minimum the tendency to back pressure.

Two cam shafts 5 are provided, one on each side of the cylinder block and operate relatively to the crank shaft. Each cam shaft operates both admission and exhaust valves, and provides a very simple and efficient means for valve actuation.

The exhaust valve actuating cams on one side of the engine, are preferably set to advance the opening of the exhaust valves on that side of the cylinder, before the opening of the exhaust valves on the other side of the cylinder. This secures an initial reduction of pressure at the beginning of the exhaust. And since the exhaust valves, which have the advance opening, deliver to a separate manifold from the manifold to which the other exhaust valves deliver, back pressure is reduced to a marked degree and the scavenging efficiency is improved.

In other words by allowing part of the exhaust to escape out of one side into its own separate manifold, and the balance of the exhaust through the valves on each side to their own separate manifolds, back pressure is prevented and thorough scavenging secured.

What I claim is:—

1. An internal combustion engine, comprising a plurality of power cylinders, a valve controlled admission port on each side of each cylinder, manifold gas conductors flanking the cylinders and delivering to the admission ports, a conductor of arch formation delivering to the flanking conductors midway their two ends and a carbureter positioned above the cylinder heads, having its central portion approximately in the plane passing through the axes of the cylinders, and delivering to the conductor of arch formation at the middle part thereof.

2. An internal combustion engine, comprising a plurality of power cylinders, a valve controlled admission port on each side of each cylinder, manifold gas conductors flanking the cylinders and delivering to the admission ports, a conductor arching above and spanning the flanking conductors and delivering thereto at the middle parts thereof and a carbureter delivering to the spanning conductor, said carbureter positioned above the cylinder heads and having its vertical axis on a middle line in the plane passing through the axes of all the cylinders.

SAMUEL LAWRENCE WALDEN.

Witnesses:
   CLARENCE LEE COLE, Jr.,
   THERESA M. WOOLBERT.